(12) United States Patent
Caliri et al.

(10) Patent No.: US 7,545,326 B2
(45) Date of Patent: Jun. 9, 2009

(54) WIRELESS TRACKING SYSTEM AND METHOD WITH MULTIPATH ERROR MITIGATION

(75) Inventors: Dyami Caliri, Encinitas, CA (US); Derek Smith, San Diego, CA (US)

(73) Assignee: Awarepoint Corporation, San Diego, CA (US)

( * ) Notice: Subject to any disclaimer, the term of this patent is extended or adjusted under 35 U.S.C. 154(b) by 159 days.

(21) Appl. No.: 11/672,047

(22) Filed: Feb. 7, 2007

(65) Prior Publication Data

US 2008/0012767 A1 Jan. 17, 2008

Related U.S. Application Data

(63) Continuation-in-part of application No. 10/968,814, filed on Oct. 18, 2004, now Pat. No. 7,312,752.

(60) Provisional application No. 60/513,784, filed on Oct. 22, 2003, provisional application No. 60/528,052, filed on Dec. 9, 2003, provisional application No. 60/572,690, filed on May 19, 2004.

(51) Int. Cl.
G01S 3/02 (2006.01)
G08B 23/00 (2006.01)

(52) U.S. Cl. .................... 342/465; 342/450; 340/573.1

(58) Field of Classification Search ................ 342/463, 342/465, 450
See application file for complete search history.

(56) References Cited

U.S. PATENT DOCUMENTS

| | | | |
|---|---|---|---|
| 3,805,265 A | 4/1974 | Lester | |
| 3,869,673 A | 3/1975 | Close | |
| 5,119,104 A | 6/1992 | Heller | |
| 5,402,450 A | 3/1995 | Lennen | |
| 5,450,615 A | 9/1995 | Fortune et al. | |
| 5,977,913 A | 11/1999 | Christ | |
| 6,212,392 B1* | 4/2001 | Fitch et al. | ............... 455/456.2 |
| 6,259,406 B1 | 7/2001 | Sugiura et al. | |
| 6,259,894 B1 | 7/2001 | Tekinay | |
| 6,342,854 B1 | 1/2002 | Duffett-Smith et al. | |
| 6,529,164 B1 | 3/2003 | Carter | |
| 6,738,628 B1 | 5/2004 | McCall et al. | |
| 6,799,047 B1 | 9/2004 | Bahl et al. | |
| 6,839,027 B2 | 1/2005 | Krumm et al. | |
| 6,839,560 B1 | 1/2005 | Bahl et al. | |
| 6,889,032 B2 | 5/2005 | Dao et al. | |
| 6,915,135 B1 | 7/2005 | McKee et al. | |

(Continued)

OTHER PUBLICATIONS

International Search Report for PCT/US2007/089194 mailed May 26, 2008.

*Primary Examiner*—Gregory C Issing
(74) *Attorney, Agent, or Firm*—Clause Eight LLP; M. Catania; E. Lo

(57) ABSTRACT

A system (50) and method (300) for providing multipath error mitigation for real-time wireless tracking of an object (100) is disclosed herein. A plurality of sensor readings are obtained from a tag (60) attached to an object (100) within an indoor facility (70). A plurality of reading sets are generated and sorted by zones. A zone with the highest average reading is preferably selected and the location of the object (100) is calculated based on the selected zone readings. In this manner, faulty position readings are eliminated from the location calculation thereby allowing for more accurate tracking of the object (100) within the indoor facility (70).

15 Claims, 8 Drawing Sheets

U.S. PATENT DOCUMENTS

| | | |
|---|---|---|
| 6,952,574 B2 | 10/2005 | Tealdi et al. |
| 6,990,428 B1 | 1/2006 | Kaiser et al. |
| 7,050,819 B2 | 5/2006 | Schwengler et al. |
| 7,053,830 B2 | 5/2006 | Krumm et al. |
| 7,084,740 B2 | 8/2006 | Bridgelall |
| 7,126,951 B2 | 10/2006 | Belcea et al. |
| 7,433,696 B2 * | 10/2008 | Dietrich et al. .......... 455/456.2 |
| 2004/0136384 A1 | 7/2004 | Cho |
| 2004/0147232 A1 | 7/2004 | Zodnik |
| 2004/0157551 A1 | 8/2004 | Gainey et al. |
| 2004/0183682 A1 * | 9/2004 | Tenarvitz ................. 340/573.1 |
| 2004/0207523 A1 * | 10/2004 | Powell et al. .......... 340/539.13 |
| 2004/0212500 A1 | 10/2004 | Stilp |
| 2004/0235468 A1 | 11/2004 | Luebke et al. |
| 2005/0075118 A1 | 4/2005 | Lewis et al. |
| 2006/0063523 A1 | 3/2006 | McFarland |

* cited by examiner

WIRELESS TRACKING SYSTEM AND METHOD WITH MULTIPATH ERROR MITIGATION

CROSS REFERENCES TO RELATED APPLICATIONS

The Present application is a Continuation-In-Part Application of U.S. patent application Ser. No. 10/968,814, filed on Oct. 18, 2004, which claims priority to U.S. Provisional Application No. 60/572,690, filed on May 19, 2004, now abandoned, U.S. Provisional Application No. 60/528,052, filed on Dec. 9, 2003, now abandoned, and U.S. Provisional Application No. 60/513,784, filed on Oct. 22, 2003, now abandoned.

STATEMENT REGARDING FEDERALLY SPONSORED RESEARCH OR DEVELOPMENT

Not Applicable

BACKGROUND OF THE INVENTION

1. Field of the Invention

The present invention is related to wireless tracking systems and methods. More specifically, the present invention relates to a system and method for mitigating multipath errors associated with the wireless tracking of objects.

2. Description of the Related Art

The ability to quickly determine the location of objects located within a facility is becoming a necessity of life. To the uninformed observer, the placement of transponders, also known as tags, on numerous non-stationary objects whether in an office or home would appear to be an unnecessary use of resources. However, the uninformed observer fails to appreciate the complexity of modern life and the desire for efficiency, whether at the office or home.

For example, in a typical hospital there are numerous shifts of employees utilizing the same equipment. When a new shift arrives the ability to quickly locate medical equipment not only results in a more efficient use of resources, but also can result in averting a medical emergency. Thus, the tracking of medical equipment in a hospital is becoming a standard practice.

The tracking of objects in other facilities is rapidly becoming a means of achieving greater efficiency. A typical radio frequency identification system includes at least multiple tagged objects, each of which transmits a signal, multiple receivers for receiving the transmissions from the tagged objects, and a processing means for analyzing the transmissions to determine the locations of the tagged objects within a predetermined environment. One exemplary method triangulates the strongest received signals to determine the location of a tagged object. This method is based on the assumption that the receivers with the strongest received signals are the ones located closest to the tagged object. However, such an assumption is sometimes erroneous due to common environmental obstacles. Multipath effects can result in a further located receiver having a stronger signal from a tagged object than a more proximate receiver to the tagged object, which result in a mistaken location determination.

Tekinay, U.S. Pat. No. 6,259,894 for a Method For Improved Line-Of-Sight Signal Detection Using RF Model Parameters, discloses a method for reducing time-shift due to multipathing for a RF signal in an RF environment.

Close, U.S. Pat. No. 3,869,673 for a Method And Apparatus For Measuring Multipath Distortion, discloses a method for indicating multipath distortion in a received signal.

Lennen, U.S. Pat. No. 5,402,450 for a Signal Timing Synchronizer, discloses a method and apparatus for reducing the effects of multipath induced distortions on the accuracy of detecting the time of arrival of a received signal.

Fortune et al., U.S. Pat. No. 5,450,615 for a Prediction Of Indoor Electromagnetic Wave Propagation For Wireless Indoor Systems, discloses techniques for predicting RF propagation within a structure.

The prior art has yet to resolve mistaken location calculations based on multipath effects.

BRIEF SUMMARY OF THE INVENTION

One aspect of the present invention is a method for determining a real-time location of an object within an indoor facility. The method begins with obtaining a plurality of sensor readings from a transponder attached to the object. Next, a reading set is generated from the plurality of sensor readings. The reading set is then sorted by a plurality of physical regions. Then, a first physical region is selected from the plurality of physical regions. The first physical region is composed of a first plurality of sensor readings that have the highest average signal strength. Next, the first plurality of sensor readings is sorted into a second plurality of sensor readings. Each of the second plurality of sensor readings corresponds to sensor located in a zone within the first physical region. A selected zone having the highest average reading is then selected. Next, a real-time location of the object is calculated using only the second plurality of sensor readings that correspond to the selected zone.

Each sensor reading preferably comprises a signal strength, link quality, time and identification of the transponder. The method may further comprise displaying the real-time location of the object on a graphical user interface. The method may also include comparing the calculated real-time location of the object to a previously calculated location for the object. The method may include monitoring the motion state of the object to confirm movement of the object from the previously calculated location to the real-time location. In a preferred embodiment, the indoor facility is a hospital, with each of the plurality of physical regions being a floor of the hospital, and the selected zone being a room on a floor of the hospital. The plurality of sensor readings of the reading set preferably comprises from eight to thirty sensor readings for the transponder, and each sensor reading originates from a single stationary sensor positioned within the indoor facility. Each sensor reading is preferably a radio frequency transmission from the transponder. The step of obtaining a plurality of sensor readings from the transponder attached to the object preferably comprises, transmitting a radio frequency transmission from the transponder, the radio frequency transmission comprising a signal strength, link quality, time of transmission and identification of the transponder, receiving the radio frequency transmission at a plurality of stationary sensors positioned within the indoor facility, and transmitting the signal strength, the link quality, the time of transmission and the identification of the transponder from each of the plurality of stationary sensors to a server for processing.

Another object of the present invention is a system for providing real-time location information for a plurality of non-stationary objects within an indoor facility. The system includes a plurality of sensors, a plurality of transponders and a processing means. Each of the stationary sensors is positioned within the indoor facility. Each of the transponders is attached to one of the non-stationary objects. Each of the transponders has means for wirelessly transmitting to each of the stationary sensors transponder-specific data. The processing means processes the transponder-specific data to obtain a real-time reading set for the transponder. The processing means also processes the real-time reading set to determine a first plurality of sensor readings. The first plurality of sensor readings corresponds to a physical region within the indoor facility having the highest average reading. The processor means then processes the first plurality of sensor readings, which are associated with the selected physical region, to select a zone within the physical region having the highest average reading. The processing means then calculates the position of the non-stationary object using the sensor readings from the stationary sensors positioned within the selected zone of the selected physical region.

The transponder-specific data preferably comprises a signal strength, link quality, time and identification of the transponder. In a preferred embodiment, the indoor facility is a hospital with the physical region preferably a floor of the hospital, and the selected zone is a room on a floor of the hospital. The processing means is preferably a server in communication with the plurality of stationary sensors through a network. Each transponder preferably transmits a radio frequency transmission of approximately 2.48 gigahertz, and each stationary sensor preferably communicates utilizing a 802.15.4 protocol. The system may further comprise means for eliminating those sensor readings not associated with (i.e., located within) the selected zone.

Another aspect of the present invention is a method for determining a location of an object within a predetermined environment. The method begins with transmitting a plurality of radio frequency signals for a wireless tracking device to a positioning engine. The wireless tracking device is attached to the object and each of the radio frequency signals corresponds to a fixed signal transmitter within the environment. Each radio frequency signal is processed to determine the location of the respective fixed signal transmitter. A probable region of the object is determined based on the location of a majority of the fixed signal transmitters for the plurality of radio frequency signals. The radio frequency signals that correspond to fixed signal transmitters located outside of the probable region of the object are eliminated from the location determination. The position of the object within the predetermined environment is calculated using only the radio frequency signals that correspond to fixed signal transmitters located within the probable region of the object.

The predetermined environment is preferably a hospital, and the probable region of the object is preferably a room in the hospital. The step of transmitting a plurality of radio frequency signals for a wireless tracking device to a positioning engine preferably comprises transmitting radio frequency signals from the wireless tracking device, each radio frequency signal comprising a signal strength, link quality, time of transmission and identification of the transponder, receiving the radio frequency signals at a plurality of stationary sensors positioned within the predetermined environment, and transmitting the signal strength, the link quality, the time of transmission and the identification of the wireless tracking device from each of the plurality of stationary sensors to a server for processing.

Yet another aspect of the present invention is a system for providing real-time location information for a plurality of non-stationary objects within an indoor facility. The system includes a mapped space and a processor. The mapped space is of a physical environment of the indoor facility. The processor includes means for updating the mapped space in response to received measurements of the physical environment from one or more stationary sensors located within the indoor facility, means for generating a plurality of location hypotheses for a non-stationary object within the physical environment, at least one of the location hypotheses computed in response to measurement received from the non-stationary object and the mapped space, and means for generating a location estimate based on one or more of the plurality of location hypotheses, wherein one or more of the plurality of location hypotheses are selected based on a probability associated respectively therewith. The probability is computed in association with known barriers in the physical space.

Having briefly described the present invention, the above and further objects, features and advantages thereof will be recognized by those skilled in the pertinent art from the following detailed description of the invention when taken in conjunction with the accompanying drawings.

DETAILED DESCRIPTION OF THE INVENTION

Figure 1:
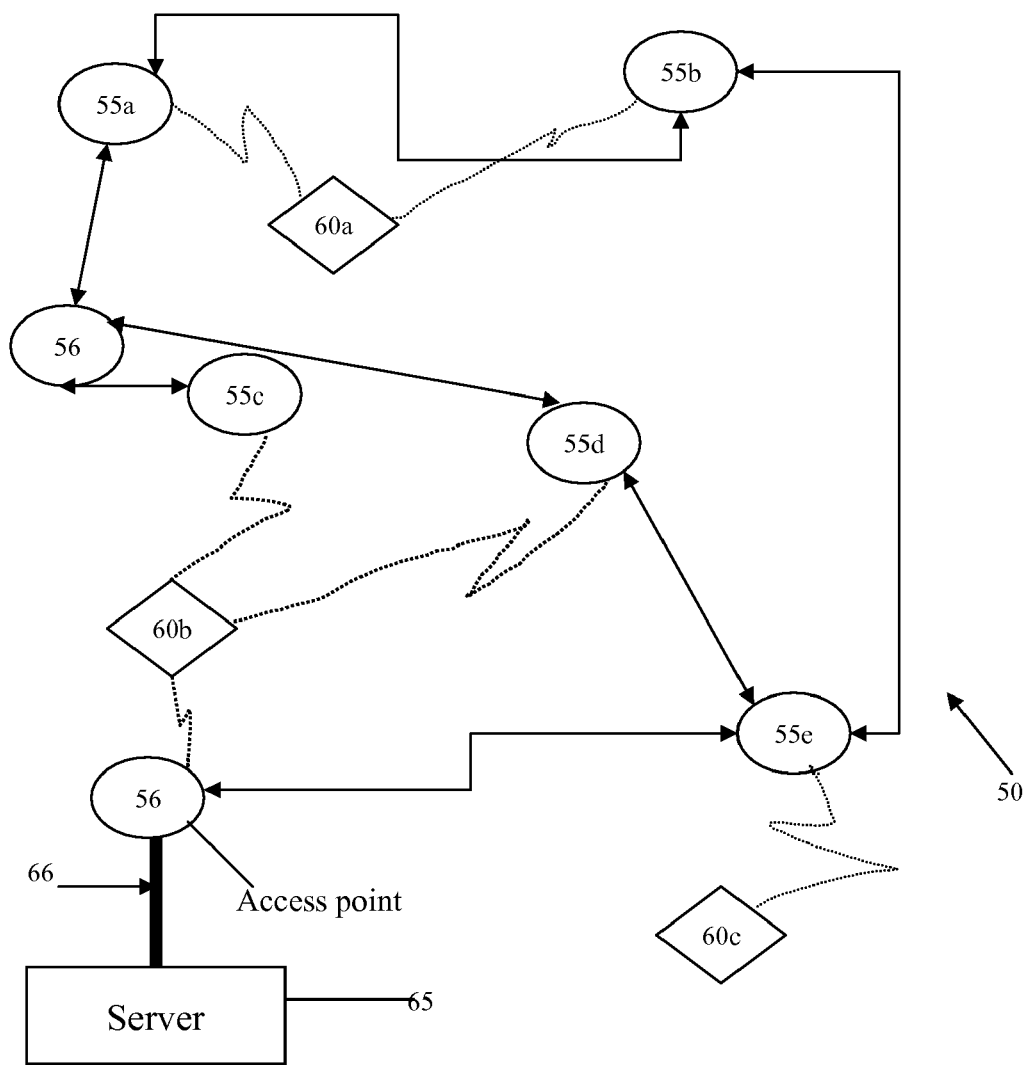
FIG. 1 is schematic view of a system of the present invention.

As shown in FIGS. 1-4, a system is generally designated 50. The system 50 is capable of determining real-time location of an object 100 within an indoor facility 70. The system 50 preferably includes a plurality of sensors 55, a plurality of bridges 56, a plurality of tags 60 and at least one server 65. One example of the components of the system 50 is disclosed in U.S. patent application Ser. No. 10/968,814, filed on Oct. 18, 2004 for a Wireless Position Location And Tracking System, which is hereby incorporated by reference in its entirety. A more specific example of the sensors 55 is disclosed in U.S. patent application Ser. No. 11/008,802, filed on Dec. 8, 2004 for a Plug-In Network Appliance, which is hereby incorporated by reference in its entirety. Another example of a system 50 is set forth in U.S. Pat. No. 6,751,455 for a Power-And Bandwidth-Adaptive In-Home Wireless Communications System With Power-Grid-Powered Agents And Battery-Powered Clients, which is hereby incorporated by reference in its entirety.

The system 50 is preferably employed within an indoor facility 70 such as a business office, factory, home, hospital and/or government agency building. The system 50 is utilized to track and locate various objects positioned throughout the facility 70. The tags 60 continuously transmit signals on a predetermined time cycle, and these signals are received by sensors 55 positioned throughout the facility 70. The sensors 55 transmit the data to a bridge 56 for transmission to a server 65. If a sensor 55 is unable to transmit to a bridge 56, the sensor may transmit to another sensor 55 in a mesh network-like system for eventual transmission to a bridge 56. In a preferred embodiment, a transmission may be sent from a transmission distance of six sensors 55 from a bridge 56. The server 65 preferably continuously receives transmissions from the sensors 55 via the bridges 56 concerning the movement of objects 100 bearing a tag 60 within the facility 70. The server 65 processes the transmissions from the sensors 55 and calculates a real-time position for each of the objects 100 bearing a tag 60 within the facility 70. The real-time location information for each of the objects 100 bearing a tag 60 is preferably displayed on an image of a floor plan of the indoor facility 70, or if the facility 70 has multiple floors, then on the floor plan images of the floors of the facility 70. The floor plan image may be used with a graphical user interface so that an individual of the facility 70 is able to quickly locate objects 100 within the facility 70.

As shown in FIG. 1, the system 50 utilizes sensors 55 to monitor and identify the real-time position of non-stationary objects bearing or integrated with tags 60. The sensors 55a-f preferably wirelessly communicate with each other (shown as double arrow lines) and with a server 65 through a wired connection 66 via at least one bridge 56, such as disclosed in the above-mentioned U.S. patent application Ser. No. 11/008, 802, filed on Dec. 8, 2004 for a Plug-In Network Appliance. The tags 60a-c transmit signals (shown as dashed lines) which are received by the sensors 55a-e, which then transmit signals to bridges 56 for eventual transmission to a server 65. The server 65 is preferably located on-site at the facility 70. However, the system 50 may also include an off-site server 65, not shown.

Each tag 60 preferably transmits a radio frequency signal of approximately 2.48 GigaHertz ("GHz"). The communication format is preferably IEEE Standard 802.15.4. Those skilled in the pertinent art will recognize that the tags 60 may operate at various frequencies without departing from the scope and spirit of the present invention.

Figure 2:
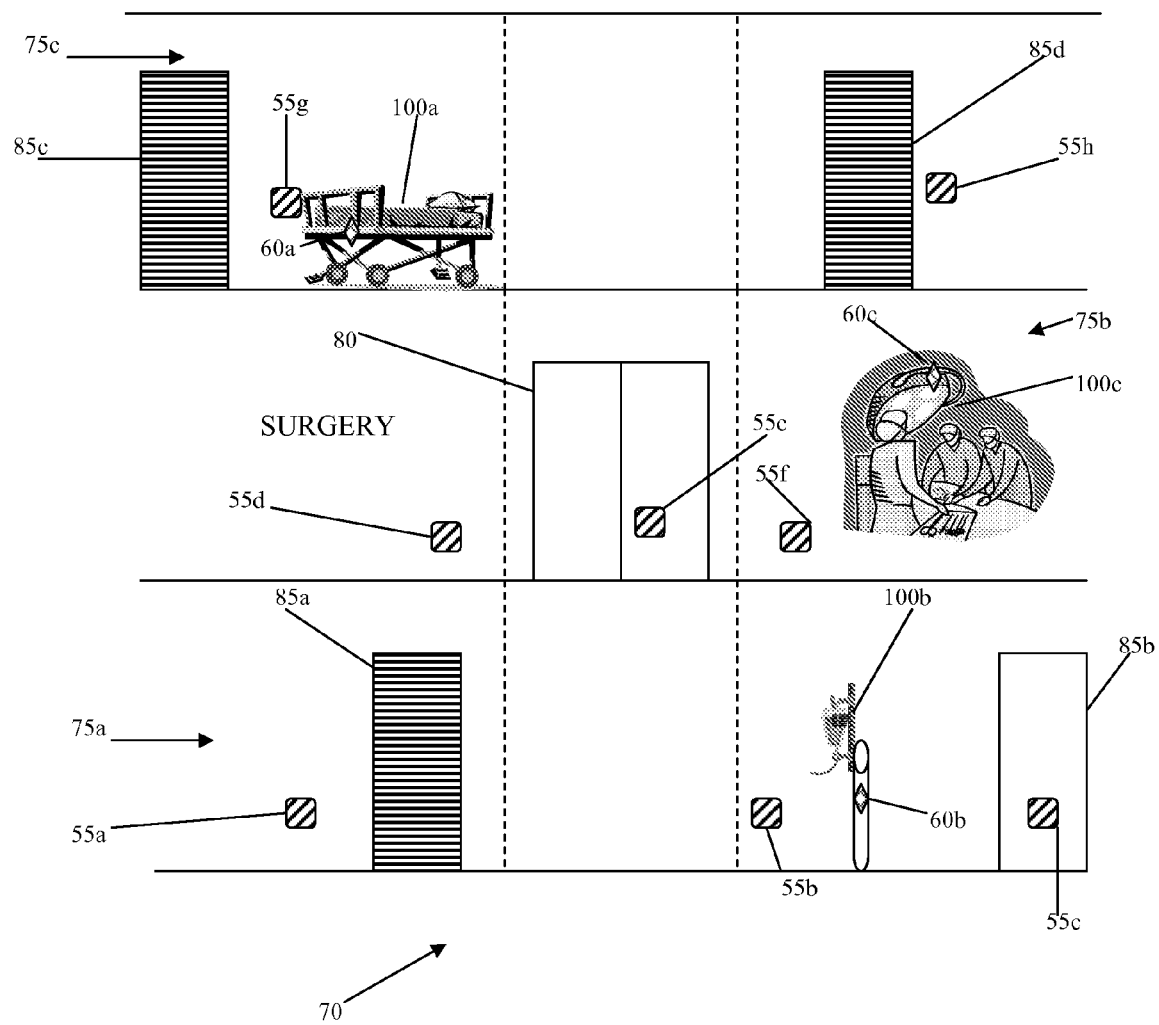
FIG. 2 is a multi-floor view of a facility employing the system of the present invention.
Figure 3:
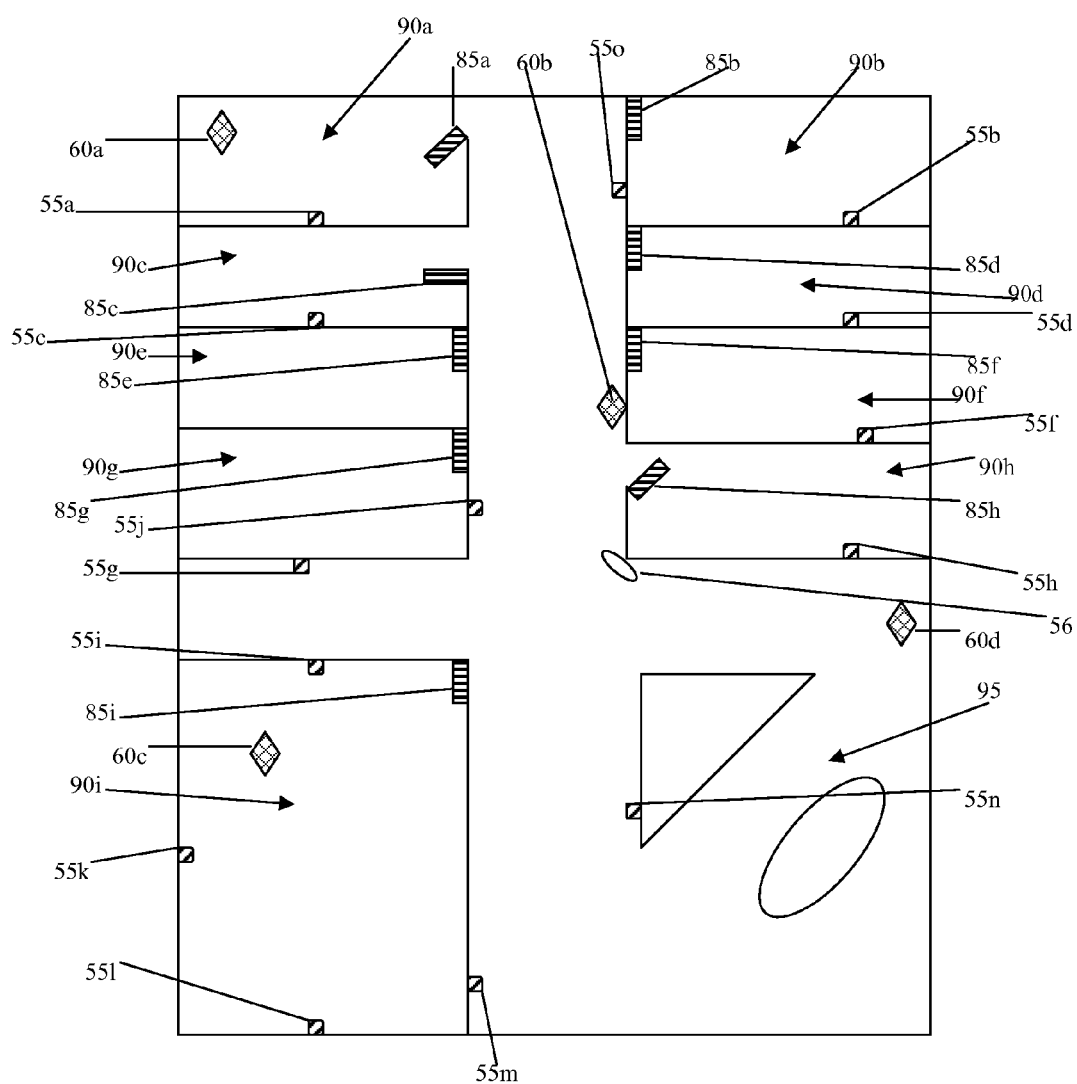
FIG. 3 is a floor plan view of a single floor in a facility employing the system of the present invention.
Figure 4:
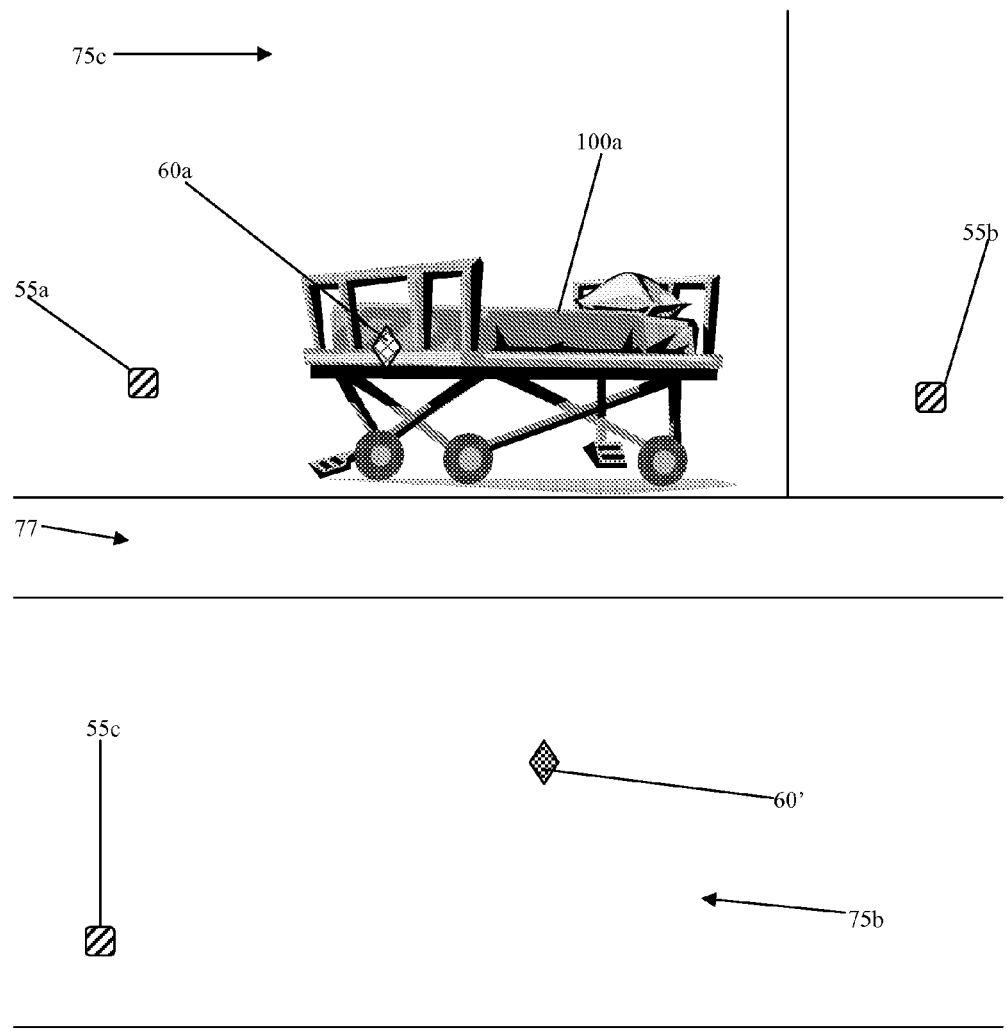
FIG. 4 is a two-floor view of a facility including a tagged object and sensors of the system of the present invention.

As shown in FIGS. 2-4, the facility 70 is depicted as a hospital. The facility 70 has a multitude of floors 75a-c. An elevator 80 provides access between the various floors 75a, 75b and 75c. Each floor 75a, 75b and 75c has a multitude of rooms 90a-i, with each room 90 accessible through a door 85. Positioned throughout the facility 70 are sensors 55a-o for obtaining readings from tags 60a-d attached to or integrated into non-stationary objects 100a, 100b (see FIGS. 2 and 4). A bridge 56 is also shown for receiving transmissions from the sensors 55 for processing by the server 65.

As shown in FIG. 4, the tag 60a is attached to movable bed 100a positioned on an upper floor 75c. The tag 60a transmits a signal which is received by sensors 55a, 55b and 55c. If the signal to sensor 55c is the strongest, then an analysis of the readings from the sensors 55a-c may place the tag 60a, and thus the movable bed 100a, at position 60' on the lower floor 75b. This type of faulty reading would likely occur with triangulation. To prevent such a faulty positioning reading, the present invention processes the readings preferably according to one of the methods illustrated in FIGS. 5-7, which would eliminate the reading from sensor 55c from the location calculation for movable bed 100a.

Figure 5:
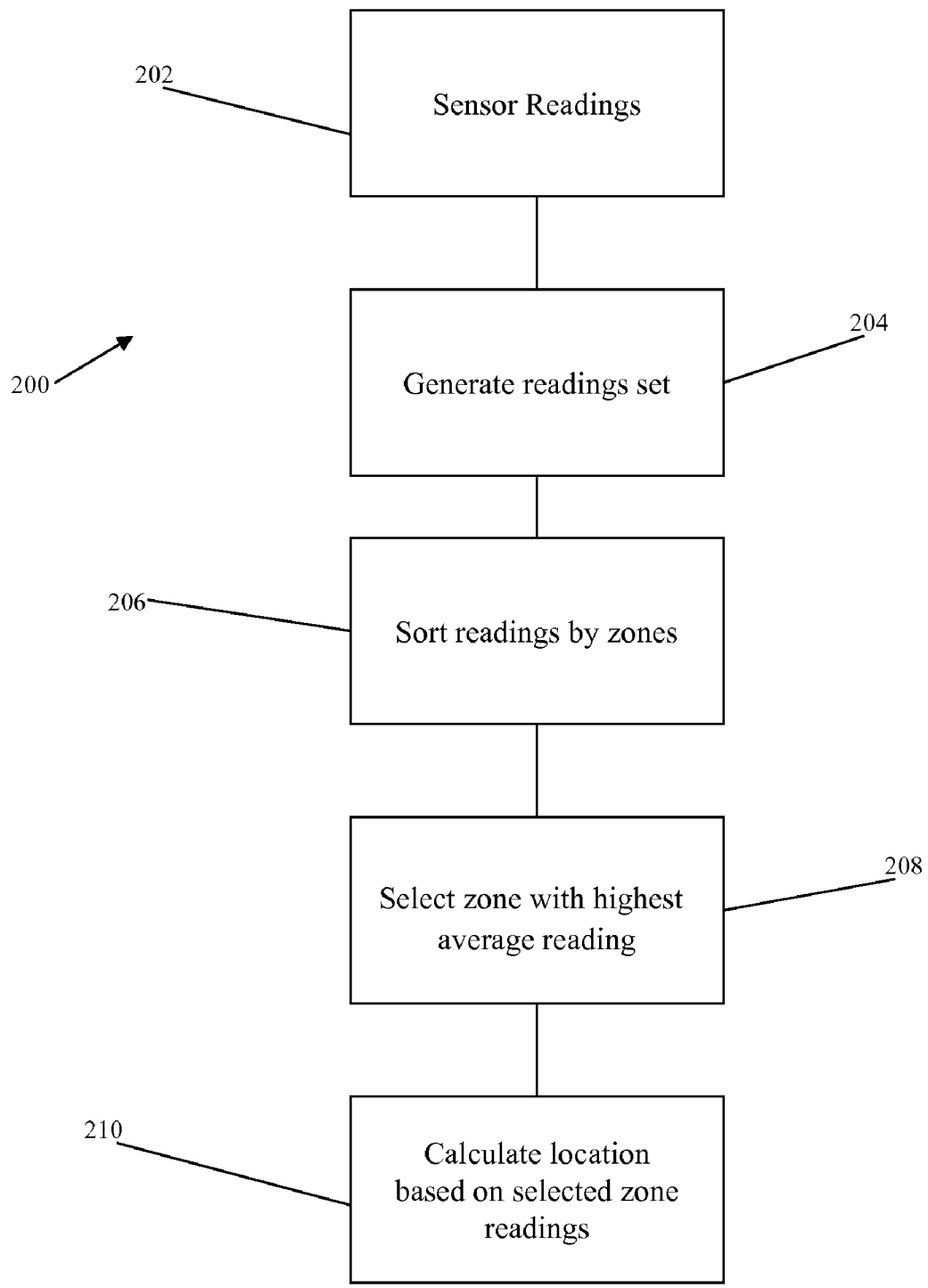
FIG. 5 is a flow chart of a general method of the present invention.
Figure 8:
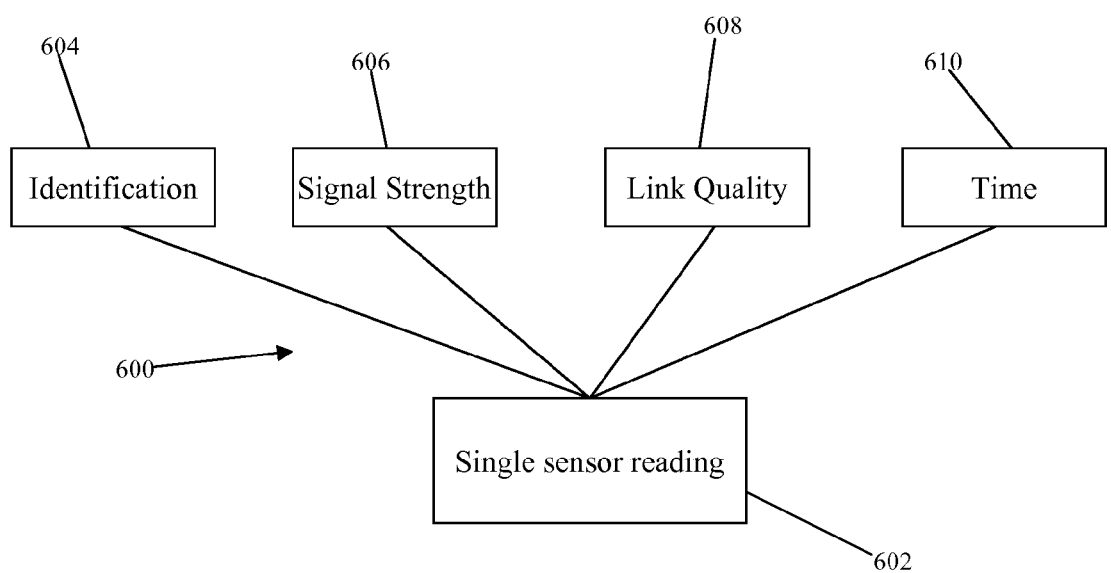
FIG. 8 is a flow chart of a single sensor reading input.

A general method 200 of the present invention is illustrated in FIG. 5. At block 202, the sensors 55 of the system 50 generate readings from the tags 60. These single sensor reading inputs 600 are illustrated in FIG. 8. As shown in FIG. 8, the inputs preferably include the tag identification 604, the signal strength 606, the link quality 608 and the time of the reading 610, which are inputted as a single sensor reading 602. At block 204, a plurality of readings sets are generated from the sensor readings. In a preferred embodiment, each of the plurality of readings sets represents an area of a facility 70. At block 206, the readings are further sorted by a particular zone of the facility 70 thereby eliminating readings that may lead to an incorrect location. In a preferred embodiment, a zone is a subset of an area. At block 208, the zone with the highest average reading is selected for calculation of the position of the object 100, again eliminating readings that may lead to an incorrect reading. At block 210, the location of the object 100 is calculated based on the readings from the selected zone.

Figure 6:
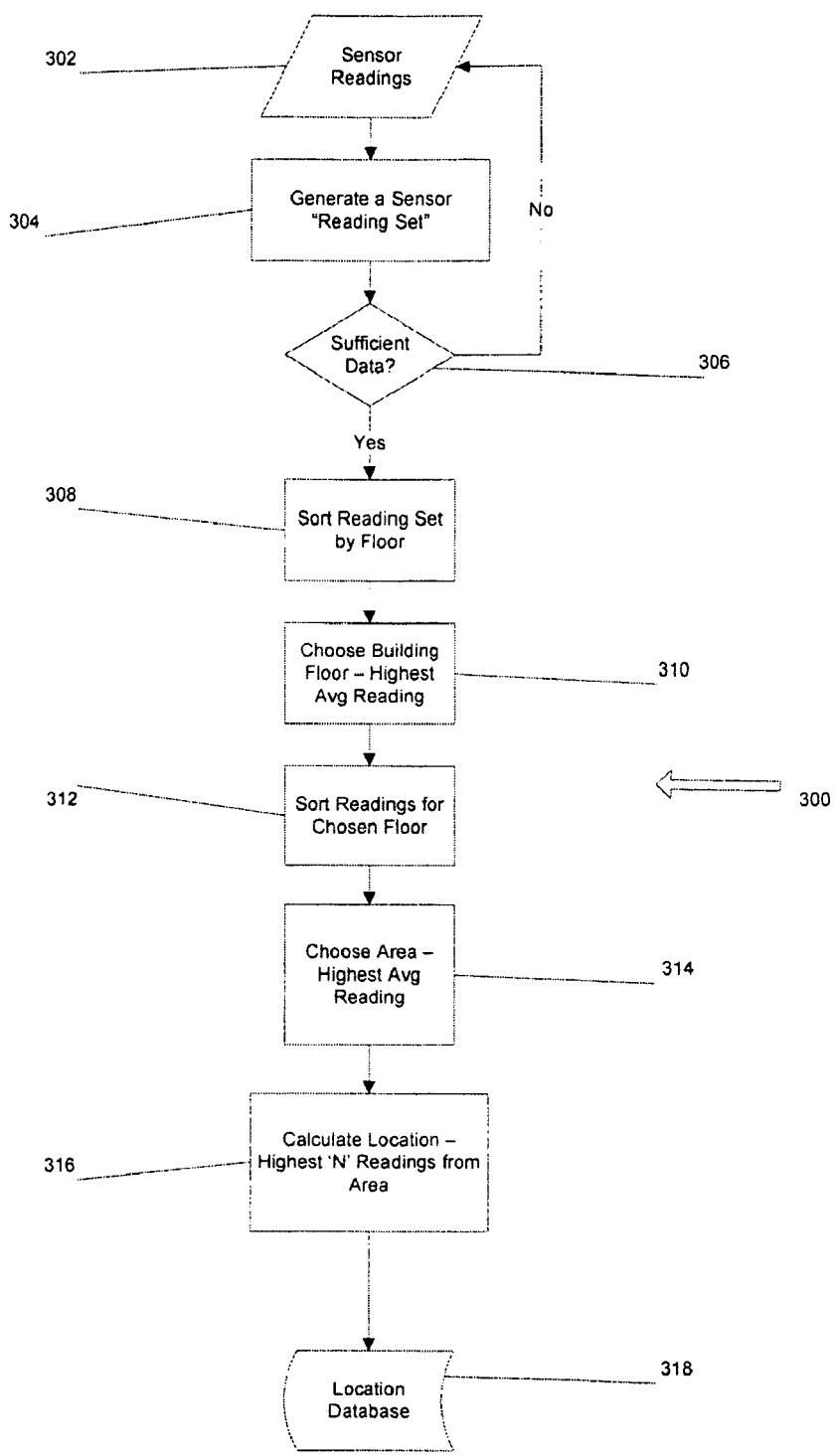
FIG. 6 is a flow chart of a specific method of the present invention.

A more specific method 300 of the present invention is set forth in FIG. 6. At block 302, the sensors 55 of the system 50 generate readings from the tags 60. As discussed above, the single sensor reading inputs 600 are illustrated in FIG. 8. At block 304, a reading set is generated for readings from a single tag 60. The generation of the reading set is typically in response to an inquiry from a user of the system 50 in search of an object 100 bearing tag 60. At decision block 306, the server 65 determines if there is sufficient data to proceed with the location analysis. If there is insufficient data, the method is restarted at block 302. If there is sufficient data, then the method proceeds to block 308. At block 308, the reading sets are separated by floor 75 of the facility 70. At block 310, the floor 75 with the highest average reading set is selected for further processing. At block 312, the readings for the selected floor are sorted by zones. Each zone may represent any physical boundary on the selected floor 75 of the facility 70. Preferably, the zones represent a room 90, station 95 or other easily determined physical location. At block 314, the zone with the highest average reading is selected. At block 316, the location of the object 100 is calculated based on the readings from the selected zone. At block 318, the location is inputted to the location database for dissemination to users of the system to locate the object 100.

Figure 7:
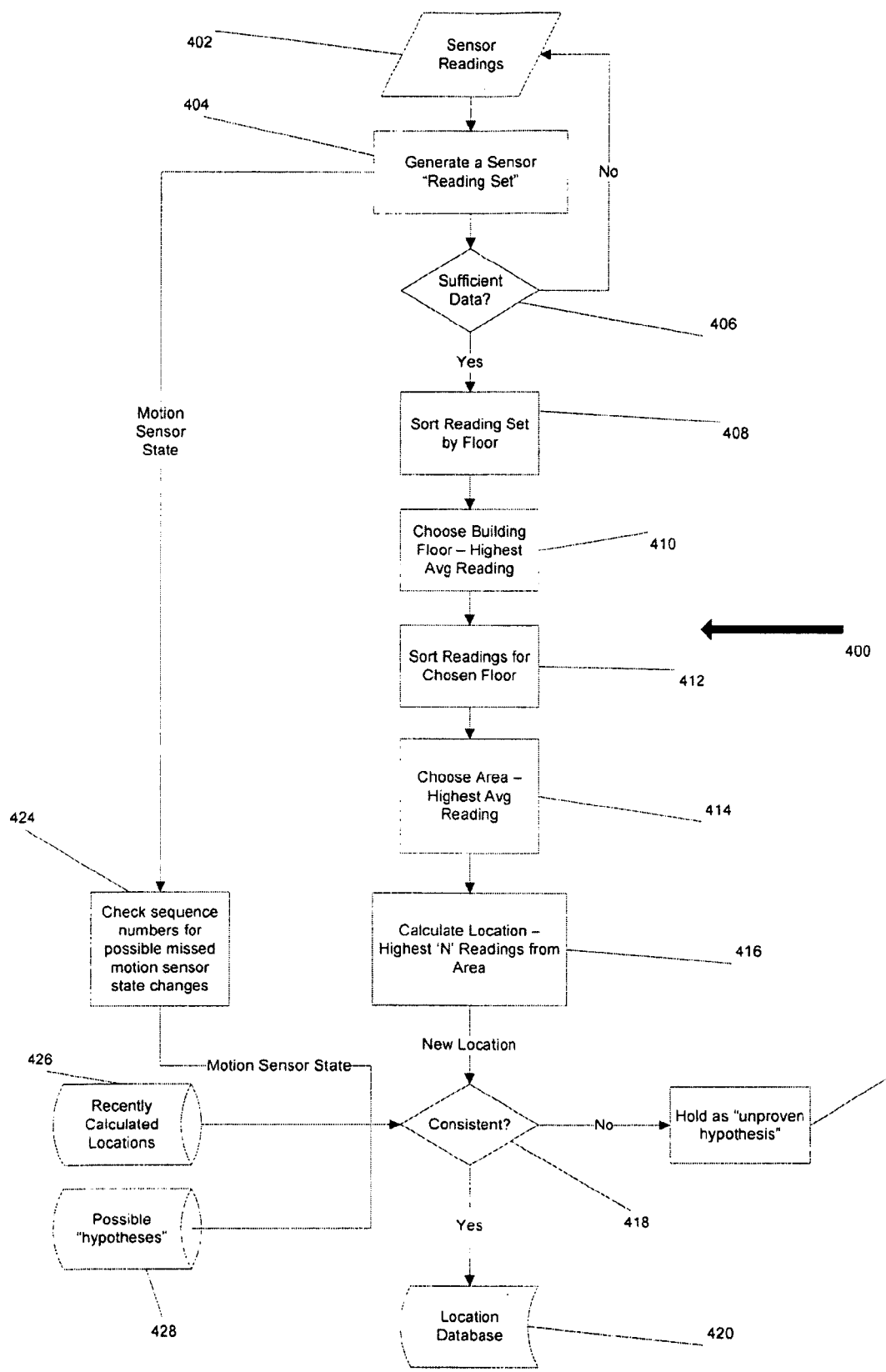
FIG. 7 is a flow chart of a specific method of the present invention.

An even more specific method 400 of the present invention is set forth in FIG. 7. At block 402, the sensors 55 of the system 50 generate readings from the tags 60. As discussed above, the single sensor reading inputs 600 are illustrated in FIG. 8. At block 404, a reading set is generated for readings from a single tag 60. The generation of the reading set is typically in response to an inquiry from a user of the system 50 in search of an object 100 bearing tag 60. At decision block 406, the server 65 determines if there is sufficient data to proceed with the location analysis. If there is insufficient data, the method is restarted at block 402. If there is sufficient data, then the method proceeds to block 408. At block 408, the reading sets are separated by floor 75 of the facility 70. At block 410, the floor 75 with the highest average reading set is selected for further processing. At block 412, the readings for the selected floor are sorted by zones. Each zone may represent any physical boundary on the selected floor 75 of the facility 70. Preferably, the zones represent a room 90, station 95 or other easily determined physical location. At block 414, the zone with the highest average reading is selected. At block 416, the location of the object 100 is calculated based on the readings from the selected zone.

At decision block 418, the server 65 inquires if the new calculated location is consistent with available data for the object 100. The available data includes the motion sensor state of the object 100 which is tracked at block 424. If the motion sensor has not detected a motion threshold of the object 100, then that is one indication that the new calculated location is in error. However, if the motion sensor has detected movement (a motion threshold) of the object 100, then that is one indication that the new calculated location is correct. Additional data for the decision block 418 includes recently calculated locations for the object 100 which are available from database 426. Yet further data available for decision block 418 is data from the possible hypotheses database 428. The possible hypotheses database includes data such as the timing between the last calculated location and the new calculated location. If the object 100 has moved one end of the facility 70 to another end of the facility 70 within seconds, then the new calculated location may be in error. If the response to decision block 418 is yes, then at block 420 the location is inputted to the location database for dissemination to users of the system to locate the object 100. If the response to decision block 418 is no, then the new calculated location is held as an unproven hypothesis at block 422.

The following example illustrates the information that is utilized and in practicing the present invention.

TABLE ONE

| Sensor # | Signal Strength dB | Link Quality | Time | Sensor Location (floor/region) |
|---|---|---|---|---|
| 1 | −95 | −95 | Sep. 14, 2006 11:22:35 | 5/B |
| 2 | −10 | −10 | Sep. 14, 2006 11:22:35 | 4/C |
| 3 | −20 | −20 | Sep. 14, 2006 11:22:36 | 4/C |
| 4 | −25 | −25 | Sep. 14, 2006 11:22:35 | 4/C |
| 5 | −40 | −40 | Sep. 14, 2006 11:22:36 | 4/C |
| 6 | −50 | −50 | Sep. 14, 2006 11:22:36 | 4/C |
| 7 | −70 | −70 | Sep. 14, 2006 11:22:36 | 4/D |
| 8 | −80 | −80 | Sep. 14, 2006 11:22:36 | 4/D |
| 9 | −90 | −90 | Sep. 14, 2006 11:22:37 | 4/E |
| 10 | −95 | −95 | Sep. 14, 2006 11:22:37 | 4/E |

TABLE TWO

| Floor | Average Reading per Floor |
|---|---|
| 2 | N/A |
| 3 | −120 |
| 4 | −30 |
| 5 | −85 |

TABLE THREE

| Region | Peaks | Average Reading per Region |
|---|---|---|
| C | −20 | −20 |
| D | −10 | −70 |
| E | −70 | −95 |

As shown in Table One, the signal strength from each tag 60 is provided dBm with a full strength value of zero, which is a ratio of power relative to 1 milli-Watt. The Link Quality value is provided as a similar value as the signal strength. The time is a date stamp of the time and date that the signal is received by the sensor 55. The sensor location is preferably a floor and region on the floor. In a preferred embodiment, the regions on the floors overlap each other. The regions are preferably determined based on the facility 70.

In Table One, ten readings from sensors 55 positioned on various floors of the facility 70. Each of the readings is transmitted from a single tag 60 to the sensors 60. The sensors 60 transmit the data from the tag 60 to the server 65 via bridges 56. The server 65 uses the data to calculate the location of the object 100 as discussed. The sensor location may also be provided in terms of a X-Y position which is based on a floor plan image of each floor of the facility 70. The X-Y position may be based on the pixel location on the image of the floor plan.

The average reading from all of the sensors 55 on each floor is provided in Table Two. More specifically, if the fifth floor has ten sensors 55 that each received a signal from a specific tag 60, then the readings from those ten sensors 55 are averaged to obtain the average reading per floor value provided in Table Two. The readings from the floor with the highest value are then further processed to determine the location of the object 100. The readings from the sensors 55 on the other floors are eliminated from the calculation for the location of the object 100.

The average reading from all of the sensors 55 in each region on the selected floor is provided in Table Three. As mentioned above, the regions preferably overlap so that a single sensor 55 may be in two or more regions, and used in the average reading for both regions. The peak reading for each region is also set forth in Table Three. In an alternative embodiment, if the peak reading exceeds a threshold, then that region is selected even if the average readings for that region are less than another region. In calculating the location of the object 100, the highest readings within a selected region are used for the calculation. The number of readings used preferably ranges from 2 to 10, and is most preferably 3 to 5. The more readings used in the calculation, the longer the processing time for the calculation. Thus, using 10 readings may provide a more accurate location, however, the processing time will be longer than using 3 readings. In a preferred embodiment, a radial basis function is utilized in calculating the location of the object 100. The location of the object 100 is preferably conveyed as an XY coordinate on an floor plan image of the facility 70.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes modification and substitutions of equivalents may be made therein without departing from the spirit and scope of this invention which is intended to be unlimited by the foregoing except as may appear in the following appended claim. Therefore, the embodiments of the invention in which an exclusive property or privilege is claimed are defined in the following appended claims.

The invention claimed is:

1. A method for determining a real-time location of an object within an indoor facility, the method comprising:
   obtaining a plurality of sensor readings from a tag attached to the object;
   generating a reading set comprising the plurality of sensor readings;
   sorting the reading set by a plurality of physical regions;
   selecting a first physical region of the plurality of physical regions, the first physical region composed of a first plurality of sensor readings having the highest average signal strength;
   sorting the first plurality of sensor readings into a second plurality of sensor readings, each of the second plurality of sensor readings corresponding to a zone within the first physical region;

selecting a selected zone having the highest average reading; and calculating a real-time location of the object from a plurality of the highest sensor readings from the second plurality of sensor readings corresponding to the selected zone.

2. The method according to claim 1 wherein the sensor readings comprise signal strength, link quality, time and identification of the tag.

3. The method according to claim 1 further comprising displaying the real-time location of the object on a graphical user interface.

4. The method according to claim 1 further comprising comparing the calculated real-time location of the object to a previously calculated location for the object.

5. The method according to claim 4 further comprising monitoring the motion state of the object to confirm movement of the object from the previously calculated location to the real-time location.

6. The method according to claim 1 wherein the indoor facility is a hospital, each of the plurality of physical regions is a floor of the hospital, and the selected zone is a room on a floor of the hospital.

7. The method according to claim 1 wherein the plurality of sensor readings of the reading set comprises from eight to thirty sensor readings for the tag, and each of the plurality of sensor readings originates from a single stationary sensor positioned within the indoor facility.

8. The method according to claim 1 wherein each of the plurality of sensor readings is a radio frequency transmission from the tag.

9. The method according to claim 1 wherein obtaining a plurality of sensor readings from a tag attached to the object comprises:

transmitting a radio frequency transmission from the tag comprising signal strength, link quality, time of transmission and identification of the tag;

receiving the radio frequency transmission at a plurality of stationary sensors positioned within the indoor facility; and transmitting the signal strength, the link quality, the time of transmission and the identification of the tag from each of the plurality of stationary sensors to a server for processing.

10. A system for providing real-time location information for a plurality of non-stationary objects within an indoor facility, the system comprising:

a plurality of stationary sensors, each of the plurality of stationary sensors positioned within the indoor facility;

a plurality of tags, each of the plurality of tags attached to one of the plurality of non-stationary objects, each of the plurality of tags having means for wirelessly transmitting to each of the plurality of stationary sensors tag specific data; and means for processing the tag specific data to obtain a real-time reading set for the tag, to process the reading set to determine a first plurality of sensor readings with the highest average reading, to select a physical region within the indoor facility having the highest average reading, to select a zone within the physical region having the highest average reading, and to calculate the position of an object from the sensor readings positioned within the selected zone.

11. The system according to claim 10 wherein the tag specific data comprises signal strength, link quality, time and identification of the tag.

12. The system according to claim 10 wherein the indoor facility is a hospital, the physical region is a floor of the hospital, and the selected zone is a room on a floor of the hospital.

13. The system according to claim 10 wherein the processing means is a server in communication with the plurality of stationary sensors through at least one bridge.

14. The system according to claim 10 wherein each of the plurality of tags transmits a radiofrequency transmission of approximately 2.48 GigaHertz, and each of the plurality of stationary sensors communicates utilizing a 802.15.4 protocol.

15. The system according to claim 10 further comprising means for eliminating sensor readings not associated with the selected zone.

* * * * *